United States Patent [19] 4,119,331
Jackson [45] Oct. 10, 1978

[54] COLLAPSIBLE GOLF CART TRAILER

[76] Inventor: R. Kelley Jackson, 665 S. Alton Way, Denver, Colo. 80231

[21] Appl. No.: 836,249

[22] Filed: Sep. 26, 1977

[51] Int. Cl. ............................................. B62k 15/00
[52] U.S. Cl. .................................. 280/639; 280/647; 280/650; 280/652; 280/656
[58] Field of Search ............... 280/647, 650, 652, 656, 280/657, 639; 297/334, 331, 15

[56] References Cited

U.S. PATENT DOCUMENTS

| | | | |
|---|---|---|---|
| 1,030,635 | 6/1912 | Baldwin | 280/657 |
| 3,580,348 | 5/1971 | Di Blasi | 280/639 |
| 3,612,603 | 10/1971 | Snyder | 280/647 |

Primary Examiner—Robert R. Song
Attorney, Agent, or Firm—Kyle W. Rost

[57] ABSTRACT

A collapsible trailer has a rigid base framework formed from longitudinal members and transverse stringers supporting an axle having wheels. On the framework in a seat support structure having a forward, rearwardly angling arm, and a rearward, forwardly angling bracket that are joined in a T-shaped sleeve assembly that includes a transverse sleeve pivotable on the rear bracket and a longitudinal sleeve that engages the arm in socketed relationship. A turnbuckle tensions the bottom of the seat against the framework to hold the supporting structure at any desired degree of firmness. A rear cargo platform is firmly attached to the framework at its forward end and has a foldable rearward end that rests against the wheel axle when in unfolded position.

5 Claims, 6 Drawing Figures

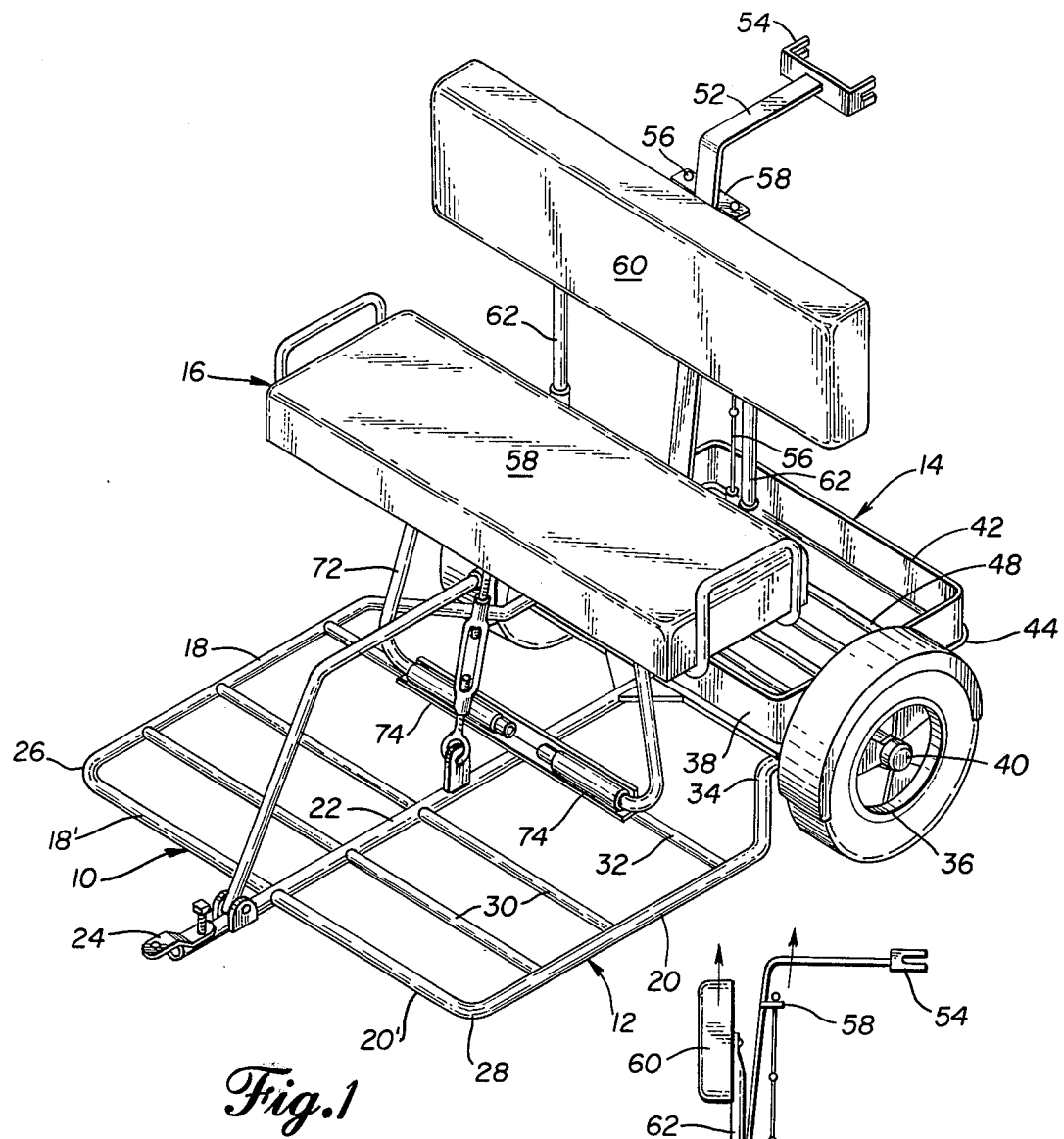

COLLAPSIBLE GOLF CART TRAILER

BACKGROUND OF THE INVENTION

1. Field of the Invention

The invention relates to land vehicles of the collapsible kind. It also relates to motor vehicles. Specifically, the invention is a foldable trailer adapted for use as part of a golf cart or the like vehicle.

2. Description of the Prior Art

U.S. Pat. No. 3,513,924 describes a motor driven golf cart with a detachable rider unicycle. This cart offered satisfactory support for a single rider, but was not easily used by a greater number of persons. The present invention offers greater carrying ability, better stability on rough terrain and more versatile adaptation to useful employment. At the same time, the present invention is extremely compact and can easily be carried in the trunk of an automobile.

Folding carts of many descriptions are known, both for golf and other purposes. Often these carts have telescoping frame members held in place by spring loaded pins, as taught in U.S. Pat. No. 3,329,228 to Harris, or they may have pivotable frame members locked in a preferred position by pins, as taught by U.S. Pat. No. 1,652,190 to Wills. In any such structure, the telescoped or folded parts are subject to vibration and general looseness, especially if the cart is used for off-road purposes and therefore subjected to rough traveling surfaces. If no means is provided to eliminate vibration, the pins or other similar locking means will become progressively looser, with either the pin or framework eventually failing, for example by cracking or tearing, or the pin may be lost.

It is necessary that an off-road vehicle such as a collapsible golf cart be rigidly assembled both for longevity of cart life and the safety of the riders. Unnecessary pitching and rocking caused by looseness in the frame of a cart can be especially dangerous to passengers, who are not holding associated steering means, and to weighty cargo such as a bag of golf clubs. For these reasons, prior art collapsible carts have not been fully satisfactory.

SUMMARY OF THE INVENTION

In a collapsible cart that can be connected to a source of locomotion, a rigid base framework carries a collapsible seat support structure having a rearward angling forward arm and a forwardly angling rear bracket. The bracket carries a transverse sleeve on its upper end, and a perpendicular, longitudinal sleeve is attached to the transverse sleeve, forming a T shape. The forward arm has a free end that is inserted into the longitudinal sleeve for forming a solid supporting structure for a bench seat that receives the transverse and longitudinal sleeves in channels on the bottom of the seat. The seat and supporting structure are locked together without looseness by a turnbuckle hooked to the seat forwardly of the transverse sleeve and attached to the base framework between the forward arm and rear bracket. The turnbuckle allows the seat and supporting structure to be firmly held in place regardless of wear in the various supporting elements.

The cart also has a rear cargo platform that is remarkably firm and able to support multiple bags of heavy golf clubs. A rearward folding part of the platform rests against the axle of the cart when in operative position. The object of the invention is to create a collapsible cart that provides a solid ride for at least two adults plus their golf clubs or other carried equipment. The rigidity of the cart is assured through use of a solid base frame plus a continuously tightenable tension device holding collapsible elements of the cart in unfolded position. Carried equipment itself assures the solidity of a cargo platform by pressing the foldable portion thereof against the frame mounted axle of the cart.

BRIEF DESCRIPTION OF THE DRAWINGS

FIG. 1 is an isometric view of the cart in operative position.

FIG. 2 is a side elevational view of the cart in partial section showing the structure of the cargo platform.

DESCRIPTION OF THE PREFERRED EMBODIMENT

Figure 3:
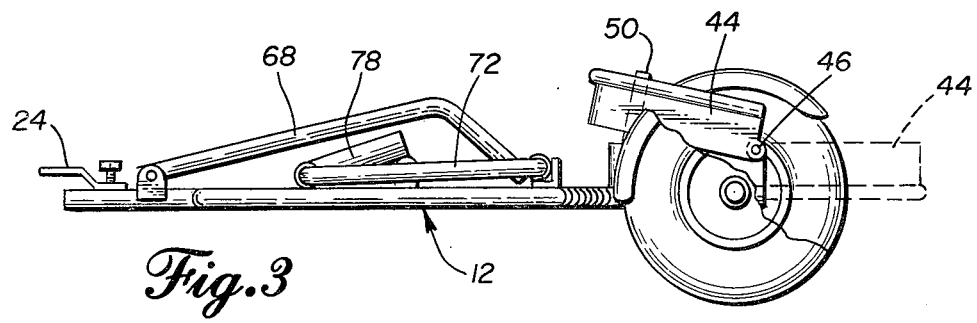
FIG. 3 is a side elevational view in partial section of the cart in folded position.

The golf cart trailer 10, as best shown in FIGS. 1 and 2, includes a base frame 12, a cargo platform 14, and seat assembly 16, which together form a collapsible structure that can be simply stored or carried in the trunk of an automobile.

Frame 12 includes right hand longitudinal frame member 18, left hand longitudinal frame member 20, and central longitudinal frame member 22, all of which are generally parallel. Central member 22 approximately bisects the cart and carries hitch means 24 at its forward end for pivotally connecting the cart to any conventional source of locomotion, such as a driven front section disclosed in U.S. Pat. No. 3,513,924 to Jackson, incorporated by reference herein.

Members 18, 20 and 22 are connected by transverse stringers, which may include forward stringers 18′ and 20′ that define the forward edge of the passenger carrying portion of the cart, and which are respectively extensions of members 18 and 20 bent mutually inwardly at forward outside corners 26 and 28 into a position approximately perpendicular to 18 and 20 and connected to member 22 at the center of the cart. Additional transverse stringers 30 are located rearwardly of 18′ and 20′, each of these stringers being connected to members 18, 20 and 22. Transverse seat support stringer 32 defines the rearward limit of the passenger carrying portion of the cart, which preferably includes at least two stringers 30 that serve as foot rests between stringer 32 and stringers 18′ and 20′. Members 18 and 20 define the maximum width of frame 12 for the length of the passenger carrying area, but angle mutually inwardly and again rearwardly to create wells 34 for wheels 36.

Cargo platform 14 fits between wheels 36 and is attached to the rearward end of frame 12. The platform is split transversely with a stationary portion 38 supported by members 18, 20 and 22, as well as by axle 40, which is connected to terminal ends of the three longitudinal frame members. Cargo platform 14 has an upwardly extending flange 42 on its forward, lateral, and rear sides for preventing objects carried on the platform from being lost. The rearward extreme of portion 38 extends slightly rearwardly of axle 40, where foldable portion 44 is pivotably connected to portion 38 by a pivot pin 46 extending through overlapping lengths of flange 42. Extending between the lateral sides of flange 42 are a plurality of spaced support bars 48.

In the preferred use of cart 10 as a golfing vehicle, the cargo platform 14 may carry a hollow socket 50 attached, for example, to member 22 immediately to the rear of the forward wall of flange 42. Socket 50 may be square in cross-section to receive complimentarily shaped insertable vertical post 52, which provides attaching means for golf bags. The upper extreme of post 52 is angled rearwardly and terminates in slotted bracket 54 that may receive the free end of resilient cord 56, the opposite end of which is connected to the vertical portion of post 52, for example at 58.

Figure 4:
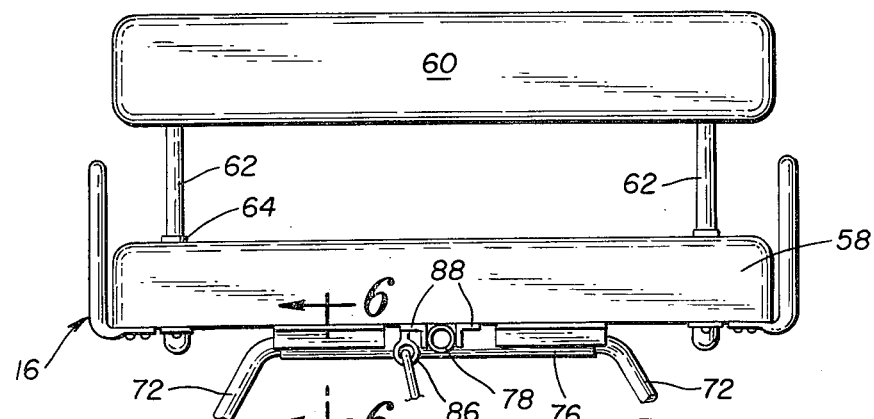
FIG. 4 is a front elevational view of the seat and its supporting framework.
Figure 5:
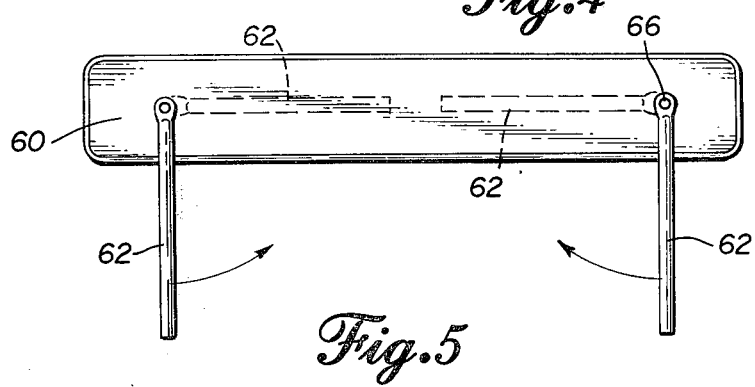
FIG. 5 is a rear elevational view of the seat back, showing the collapsed position of the seat posts in dashed lines.
Figure 6:
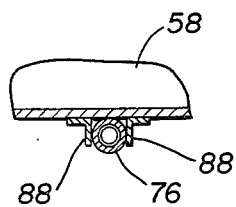
FIG. 6 is a longitudinal cross-sectional view taken along the plane of line 6—6 of FIG. 4, showing details of seat mounting structure.

The seat assembly 16, best shown in FIGS. 4-6, includes a padded bench 58 and seat back 60 attached to the bench by posts 62 fitting into sleeves 64 in socketed relationship. Each post 62 is connected to the rear of back 60 by pivot pin 66. The seat is supported on frame 12 by a generally T-shaped structure, viewed from the top, having an approximately triangular vertical longitudinal cross-section. The base of the T is longitudinal arm 68 pivotally connected to member 22 at mounting 70 forwardly of stringers 18', 20'. When in operable position, arm 68 angles upwardly and rearwardly from mounting 70, for example at 45°, and then angles horizontally rearwardly at the proper height to support bench 58. The crossbar of the T is formed from transverse brackets 72, each of which has a lower horizontal segment fitting into a hollow sleeve 74 carried by stringer 32. Brackets 72 have lower portions running laterally outwardly of sleeve 74 and then upwardly and laterally inwardly, terminating in top portions running horizontally inwardly. When viewed in transverse vertical cross section, the brackets 72 together form the approximate shape of a vertically bisected trapezoid. The top portions of brackets 72 are mutually received in a cylindrical sleeve 76 that, together with sleeve 74, retain brackets 72 in a single plane pivotable at sleeves 74. Attached at the approximate midpoint of sleeve 76 and thus forming another T-shape is perpendicular sleeve 78, adapted to receive the free end of arm 68.

Member 22 also carries the latching means for fixing the bench 58 onto the members 68 and 72. As best shown in FIG. 2, mechanically retractable means such as turnbuckle 80 is pivotally connected at a first end 82 to member 22. The second end 84 is hooked and is engagable with eyebolt 86 mounted on the bottom of seat 58, slightly offset from the centerline of the cart 10. The bottom of bench 58 also carries retaining means such as angle brackets 88 of FIG. 6 forming channels to receive sleeves 76 and 78.

The cart can be stored in folded position as shown in FIG. 3 or used in open position shown in FIGS. 1 and 2. The process for storing the cart will be described, it being understood that essentially the opposite procedure is followed to unfold the cart. Turnbuckle 80 is first untensioned sufficiently to allow hooked end 84 to be removed from eyebolt 86. Seat bench 58 and back 60 can then be lifted away from the cart and mutually separated for storage by pulling posts 62 free of sleeves 64 and then folding the posts behind back 60, as shown in FIG. 5. Vertical post 52, if used, may be pulled free of socket 50.

With the turnbuckle 80 disengaged and the seat removed, transverse brackets 72 can be pivoted rearwardly in sleeves 74, allowing the free end of arm 68 to be extracted from sleeve 78. Brackets 72 can then be folded forwardly and sleeve 78 extended rearwardly by pivoting sleeve 76 on brackets 72. Arm 68 fits compactly over brackets 72.

The cargo platform may be made more compact by pivoting foldable portion 44 on pins 46 to bring the foldable portion over the stationary portion. Support bars 48 are properly located to allow socket 50 to extend through a space between bars when the platform is folded. When the cart is in unfolded position as shown in FIG. 2, the lower forward edge of foldable portion 44 of the cargo platform rests against the rear of axle 40, which provides unyielding support for holding the foldable portion in planar position aligned with the stationary portion 38. Alternatively, the lower forward edge of portion 44, which may be tubular, may abut against the lower rear edge of portion 38, which may also be tubular.

FIG. 2 also best shows that seat supporting transverse brackets 72 angle forwardly from frame 12, for example at fifteen degrees from vertical, while arm 68 angles rearwardly. It is necessary that the upper ends of brackets 72, carrying sleeves 76 and 78, be raised slightly before arm 68 can be separated from sleeve 78. Thus, the single turnbuckle 80 accomplishes the entire task of retaining the cart in unfolded position by holding members 72, 68 in position angling toward each other. The turnbuckle allows no vibration or looseness in the cart, as might be found in telescoping frames or pinned together frames.

The cart 10 has been found useful as a trailer placed behind its own motorized forward section. In this form, the cart and the independent forward section can be carried in an automobile and assembled for use in a matter of minutes. The cart is also useful as an auxiliary attachment to another powered golf cart. At many golf courses, the number of powered carts on hand is limited to accomodate the average customer demand, but at special times such as holidays, the demand may increase dramatically. The present golf cart trailer provides a compact vehicle that is inexpensive and easily stored when not needed, but that can be readily called into service as an attachment to another powered cart, effectively doubling the cart capacity at a golf course during times of heavy cart demand.

I claim:
1. A collapsible cart trailer, comprising:
 (a) a horizontal base frame having right and left hand longitudinal frame members and a central longitudinal frame member joined by a plurality of transverse stringers into a unitary rigid structure;
 (b) a longitudinal seat support arm pivotally attached to said frame near the forward end thereof and extending upwardly and rearwardly to a predetermined height, and then extending horizontally rearwardly to a free end;
 (c) a transverse seat support bracket pivotally attached to said frame at a point rearwardly of the free end of said seat support arm and extending upwardly and forwardly from the frame to an upper end, said upper end carrying a transversely extending sleeve pivotable thereon and a longitudinally extending sleeve perpendicularly connected to the transverse sleeve and engageable with the free end of said arm;

(d) a seat having transverse and longitudinal channels on the bottom side thereof adapted to receive said transverse and longitudinal sleeves, respectively;

(e) mechanically retractable tensioning means connected to said frame between the pivotal connections of the support arm and transverse bracket and connected to the bottom of said seat forwardly of said transverse channel for retaining the seat, support arm, and transverse bracket in fixed relative positions;

(f) hitch means attached to said frame near the forward end thereof for pivotally connecting the cart trailer to a source of locomotion; and (g) a transverse axle connected to the frame and carrying a wheel on each end thereof.

2. The cart of claim 1 wherein said tensioning means comprises a turnbuckle.

3. The cart of claim 2, wherein said tensioning means further comprises an eyebolt attached to the bottom of said seat, said turnbuckle having a lower end pivotally connected to said central longitudinal frame member and an upper hooked end engageable with the eyebolt.

4. The cart of claim 1, further comprising (a) a cargo platform connected to said frame over said axle and between said wheels;

(b) an upstanding flange defining the perimeter of the platform;

(c) the platform having a forward stationary portion and a rearward foldable portion, the forward portion extending longitudinally rearwardly from a position rearwardly of said transverse seat support bracket to a position approximately over said axle, and the rearward portion extending approximately from the axle to a point rearwardly of said wheels, the rearward foldable portion having a pivotal connection to the forward portion through an overlapping section of said upstanding flange, the forward lower edge of said rearward portion resting against the rearward lower edge of the forward portion.

5. The cart of claim 4, further comprising a substantially vertical socket of predetermined cross sectional configuration attached to said frame rearwardly of said transverse support bracket, and an elongated member insertable in said socket and having a complimentary cross section thereto, the elongated member having resilient means thereon for attaching an object to be carried on the cart.

* * * * *